United States Patent
Horng

(10) Patent No.: US 8,179,005 B2
(45) Date of Patent: May 15, 2012

(54) MOTOR

(75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 152 days.

(21) Appl. No.: 12/692,713

(22) Filed: Jan. 25, 2010

(65) Prior Publication Data

US 2011/0181147 A1 Jul. 28, 2011

(51) Int. Cl.
*H02K 5/16* (2006.01)
(52) U.S. Cl. .......................................................... 310/90
(58) Field of Classification Search .................... 310/90, 310/216.113, 216.133, 216.016, 216.121
See application file for complete search history.

(56) References Cited

U.S. PATENT DOCUMENTS

| 4,585,967 A * | 4/1986 | Mayer et al. ........... 310/216.123 |
| 4,682,065 A * | 7/1987 | English et al. ................. 310/90 |
| 6,102,675 A * | 8/2000 | Hsieh ........................ 417/423.13 |
| 6,654,213 B2 * | 11/2003 | Horng et al. ..................... 361/23 |
| 6,700,257 B2 | 3/2004 | Lin |
| 7,944,103 B2 * | 5/2011 | Nomura et al. ................. 310/90 |
| 2005/0046286 A1 * | 3/2005 | Horng et al. ................. 310/67 R |

FOREIGN PATENT DOCUMENTS

TW 384947 3/2000
* cited by examiner

*Primary Examiner* — Nguyen N Hanh
(74) *Attorney, Agent, or Firm* — Alan Kamrath; Kamrath IP Lawfirm, PA

(57) ABSTRACT

A motor includes a base, a stator and a rotor. The base is equipped with a shaft tube having an outer circumferential wall. The stator is coupled with the shaft tube of the base and has an assembly hole. A plurality of close-fitting portions is formed between an inner circumferential wall of the assembly hole and the outer circumferential wall of the shaft tube, and an adjustment gap is formed between each two adjacent close-fitting portions. The rotor has a shaft rotatably coupled within the shaft tube of the base.

16 Claims, 15 Drawing Sheets

MOTOR

BACKGROUND OF THE INVENTION

1. Field of the Invention

The present invention relates to a motor and, more particularly, to a motor capable of preventing the deformation of a shaft tube thereof.

2. Description of the Related Art

Modern available motors are mainly categorized as having either a metal or a plastic shaft tube. Referring to FIG. 1, Taiwan Patent Publication No. 384947 discloses a motor having a metal shaft tube. In FIG. 1, a motor 7 comprises a metal shaft tube 71 mounted on a casing seat 72, as well as a stator seat 73 closely fitted to an outer circumferential wall of the metal shaft tube 71. A plurality of bearings 74 is equipped inside the metal shaft tube 71, and a rotor 75 is coupled to the bearings 74.

During assembly, the stator seat 73 generally is fitted to the outer circumferential wall of the metal shaft tube 71 in a close-fitting manner. In a case where the stator seat 73 is fitted to the metal shaft tube 71 too closely, the metal shaft tube 71 will be excessively compressed by the stator seat 73. In this case, the metal shaft tube 71 will be easily deformed due to the compression of the stator seat 73 if there is no buffering between the metal shaft tube 71 and the stator seat 73. In addition, the deformed portions of the metal shaft tube 71 will further compress the bearings 74, causing the bearings 74 to be deformed, damaged or out of position. As a result, the lifespan of the motor 7 is decreased. Also, it is difficult to manufacture and further process the motor 7, and additional manpower will be required to manually mount the metal shaft tube 71 on the casing seat 72, making it costly to produce the motor 7.

Referring to FIG. 2, a motor 8 having a plastic shaft tube is disclosed. The motor 8 mainly comprises a base 81, a stator 82 and a rotor 83. The base 81 has a plastic shaft tube 811 with a bearing 812 fitted therein. The stator 82 is coupled with an outer circumferential wall of the plastic shaft tube 811. The rotor 83 is rotatably coupled with the bearing 812. Based on this, the stator 82 is capable of driving the rotor 83.

The plastic shaft tube 811 of the motor 8 may be integrally manufactured in a manner of injection molding, which is particularly advantageous over the motor 7 in terms of manufacturing, assembly and cost. During assembly, the stator 82 may be fitted to an outer circumferential wall of the plastic shaft tube 811 in a close-fitting manner. In contrast to a metal shaft tube 71 and due to the absence of buffering between the plastic shaft tube 811 and the stator 82, the plastic shaft tube 811 tends to be deformed more easily when the plastic shaft tube 811 is excessively compressed by the stator 82.

To avoid the above potential problems of the motor 8, Taiwan Patent Publication No. 519259 discloses a motor as shown in FIG. 3. In FIG. 3, a traditional motor 9 comprises a shaft seat 91 having an annular groove 911 formed thereon. Based on this, an inner circular wall 912 and an outer circular wall 913 form two opposite sides of the shaft seat 91. The inner circular wall 912 is provided to receive a bearing 92, and the outer circular wall 913 is provided to be fitted by a stator seat 93, with a baffle ring 94 fitted within the annular groove 911. Based on the structure, the deformation of the shaft seat 91 while fitting the stator seat 93 to the shaft seat 91 is avoided, thus preventing the bearing 92 from being excessively compressed by the shaft seat 91. However, molding of the shaft seat 91 is rather difficult as the structure thereof is somewhat complex. Therefore, there is a need to overcome the problem.

SUMMARY OF THE INVENTION

It is therefore the primary objective of this invention to provide a motor in which the shaft tube is prevented from being excessively compressed by the stator during assembly of the motor.

It is therefore the secondary objective of this invention to provide a simple-structured motor in which deformation of the shaft tube is avoided.

The invention discloses a motor comprising a base, a stator and a rotor. The base is equipped with a shaft tube having an outer circumferential wall. The stator is coupled with the shaft tube of the base and has an assembly hole. A plurality of close-fitting portions is formed between an inner circumferential wall of the assembly hole and the outer circumferential wall of the shaft tube, and an adjustment gap is formed between each two adjacent close-fitting portions. The rotor has a shaft rotatably coupled within the shaft tube of the base.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
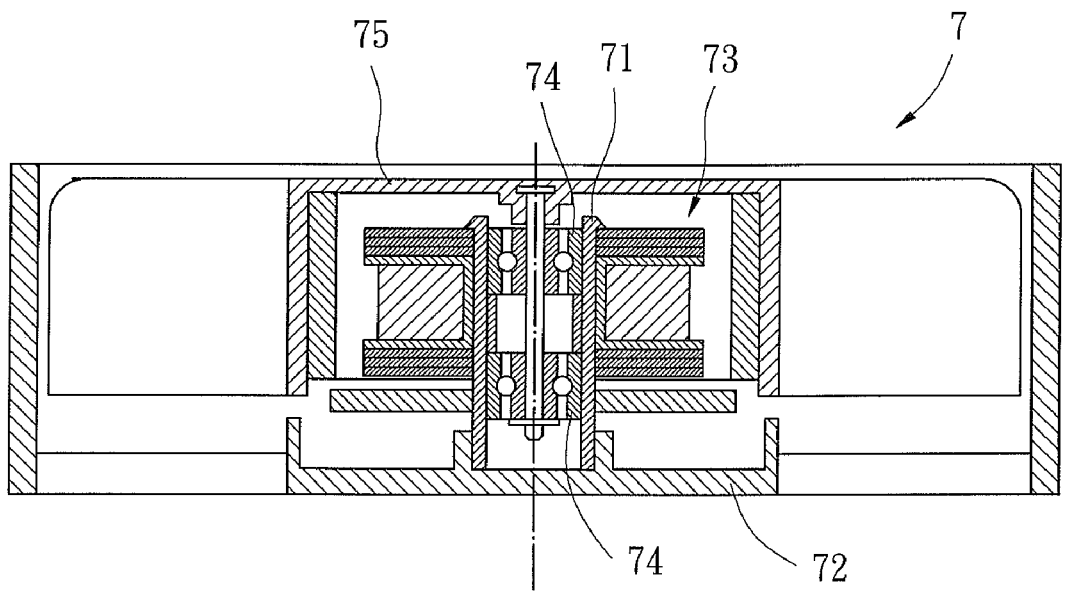
FIG. 1 shows a traditional motor having a metal shaft tube.
Figure 2:
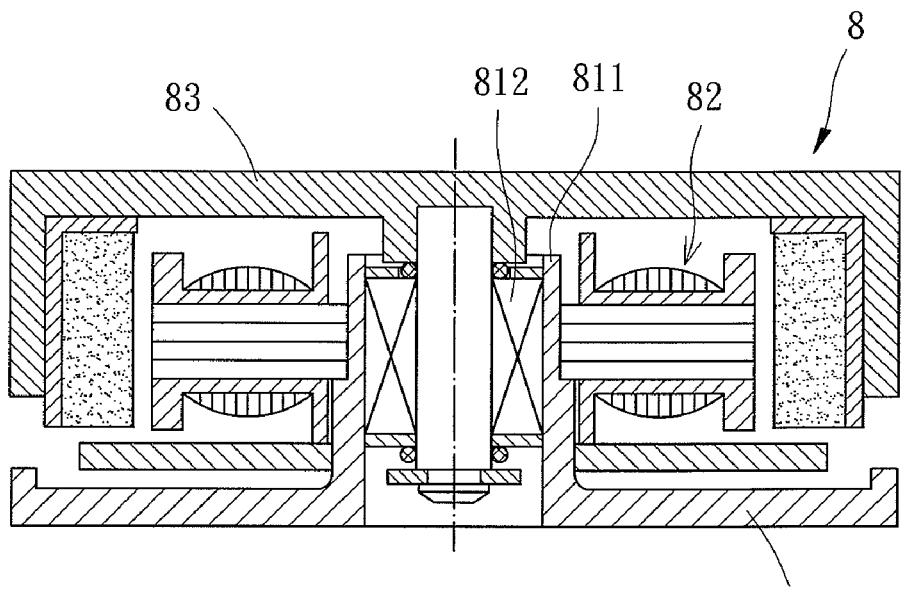
FIG. 2 shows a traditional motor having a plastic shaft tube.
Figure 3:
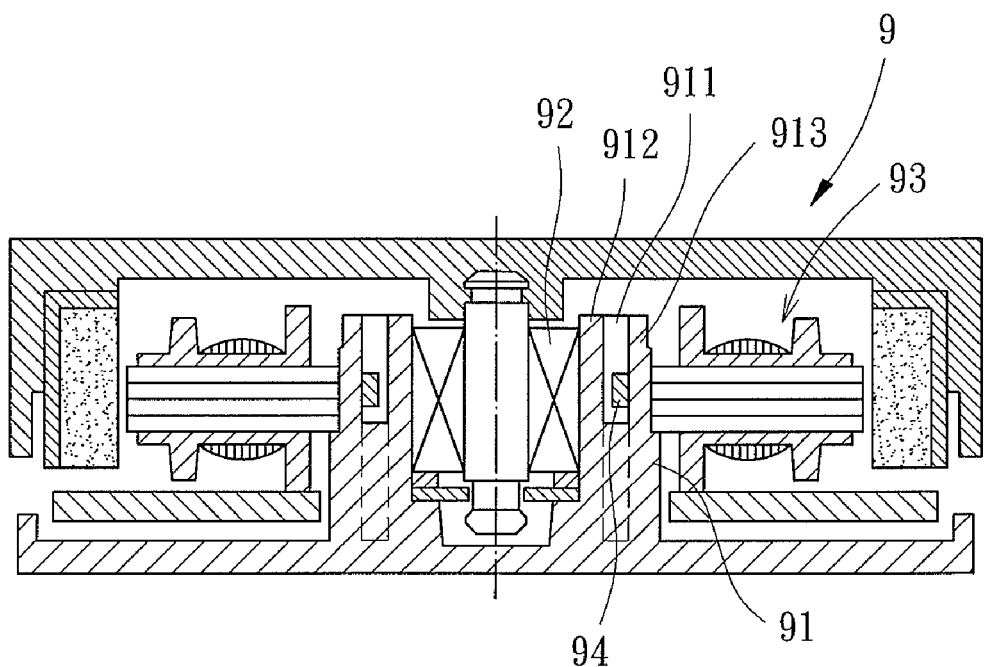
FIG. 3 shows another traditional motor having a metal shaft tube.

In the various figures of the drawings, the same numerals designate the same or similar parts. Furthermore, when the term "first", "second", "third", "fourth", "inner", "outer" "top", "bottom" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Figure 4:
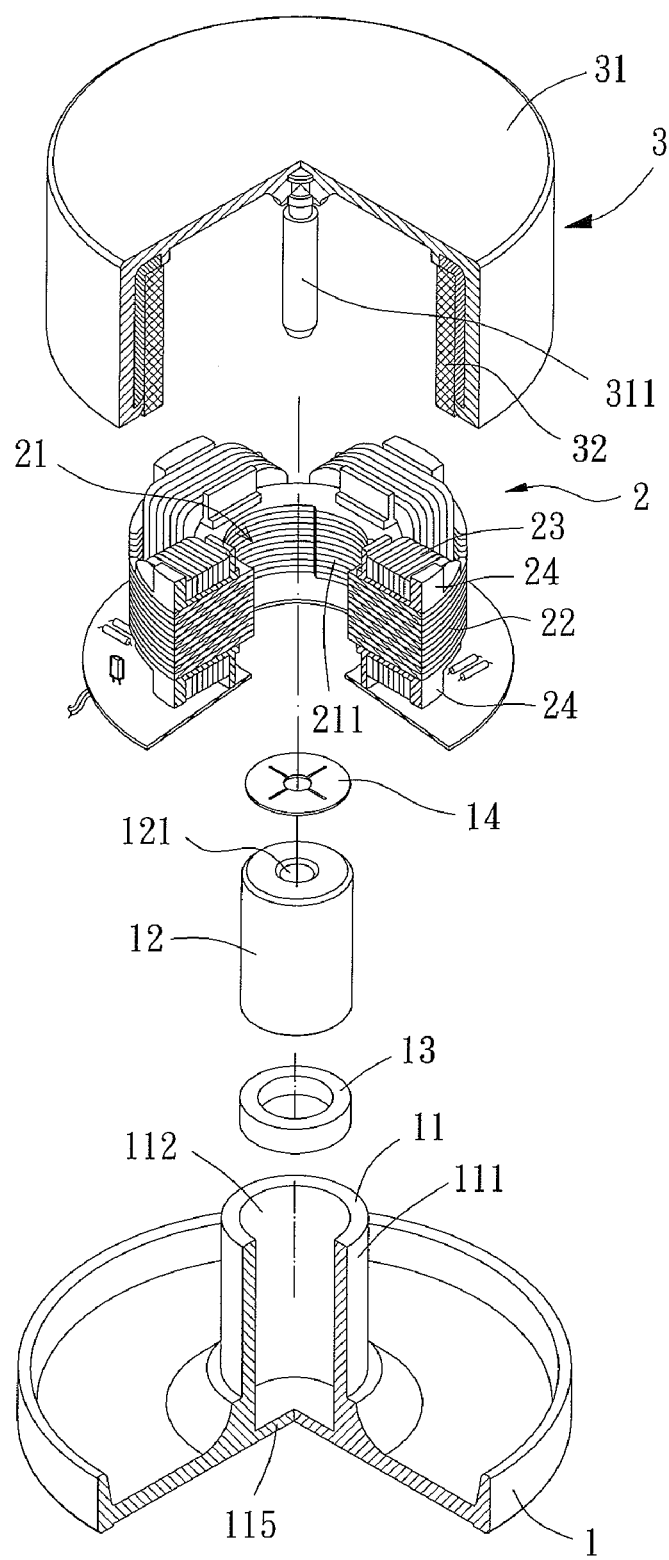
FIG. 4 shows an exploded diagram of a motor according to a first embodiment of the invention.
Figure 5:
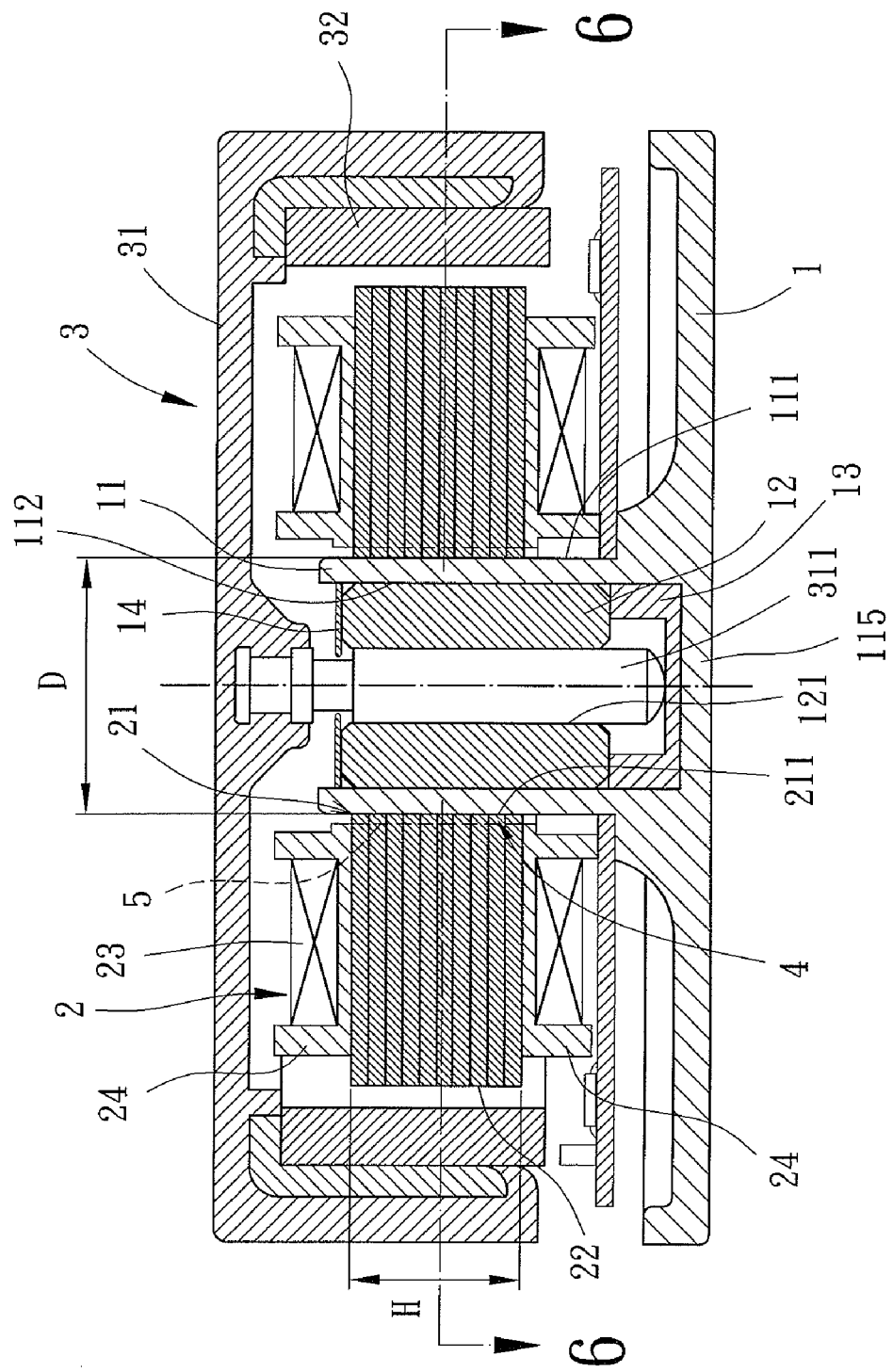
FIG. 5 shows a side cross sectional view of the motor according to the first embodiment of the invention.

In FIGS. 4 and 5, a motor of the present invention comprises a base 1, a stator 2 and a rotor 3. The base 1 is provided to mount the stator 2 and the rotor 3, and the stator 2 is provided to drive the rotor 3.

The base 1 is mounted with a shaft tube 11 made of either a metal or plastic material, with the plastic one preferred. The shaft tube 11 has an outer circumferential wall 111, with an opening 112 formed on a side thereof. At least one bearing 12 is received within the shaft tube 11. The bearing 12 may be settled into the shaft tube 11 via the opening 112. In the embodiment of FIG. 4, the number of the bearing 12 is one, and the bearing 12 has an axial hole 121. The bearing 12 preferably comprises a wear-resistant member 13 and a holding member 14.

The stator 2 is mounted on the base 1 and has an assembly hole 21 which allows the shaft tube 11 to be fitted therethrough. In the embodiment, the stator 2 that drives the rotor 3 may consist of a plurality of silicon steel plates 22, a plurality of coils 23 and two isolation members 24. The assembly hole 21 is formed by stacking the plurality of silicon steel plates 22 with one another as a stack entity. The two isolation members 24 are coupled with two ends of the stack entity of the plurality of silicon steel plates 22. The plurality of coils 23 may wind around certain portions of the plurality of silicon steel plates 22 and the isolation members 24. Note the plurality of silicon steel plates 22 may be integrally formed as the stack entity in an injection molding manner.

Figure 6:
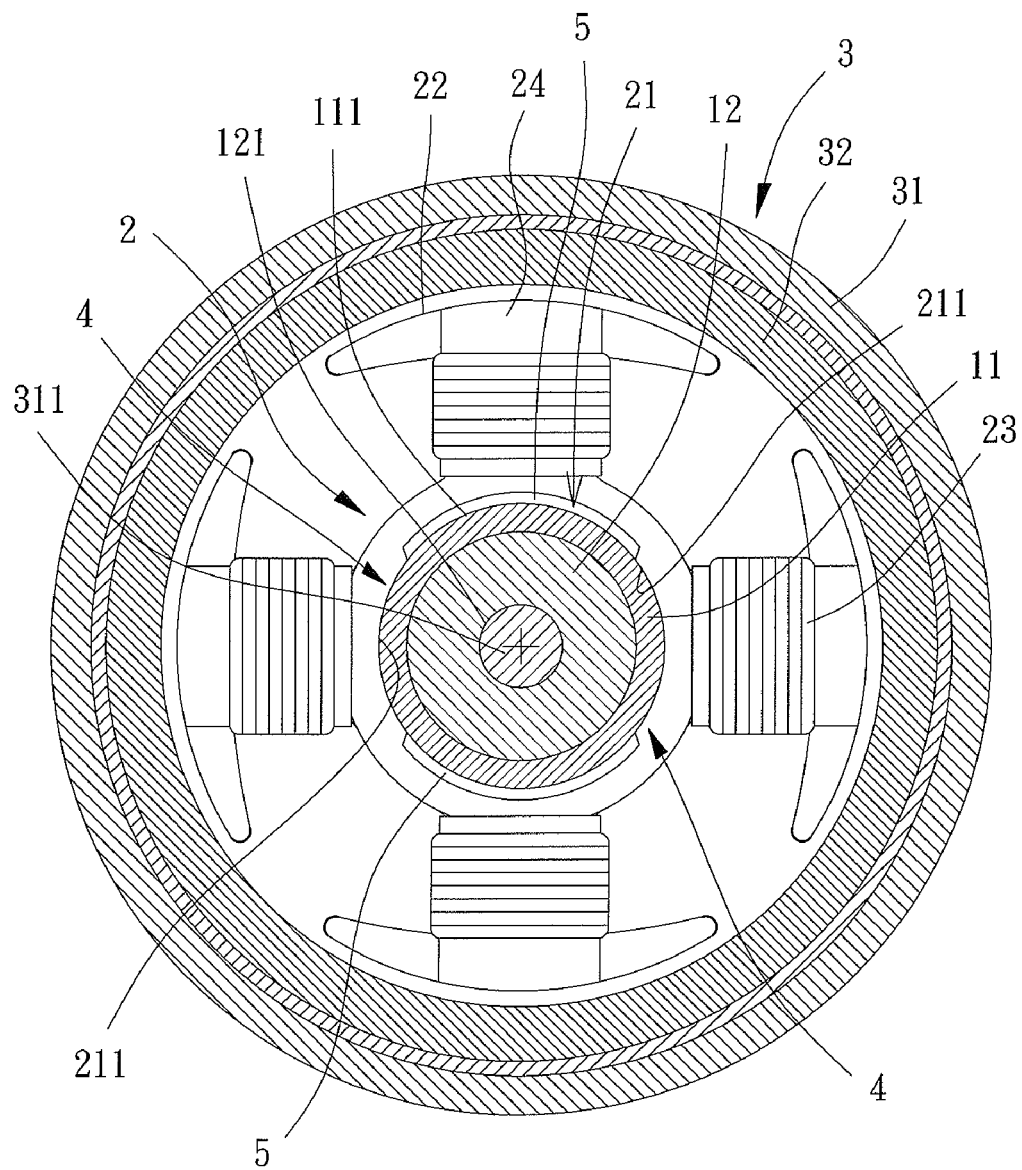
FIG. 6 shows an upper cross sectional view of the motor according to the first embodiment of the invention according to section line 6-6 FIG. 5.

Specifically, as shown in FIG. 6, a plurality of close-fitting portions 4 may be formed between an inner circumferential wall of the assembly hole 21 and the outer circumferential wall 111 of the shaft tube 11 when the stator 2 remains fitted in the shaft tube 11 of the base 1. Based on this, the stator 2 and the shaft tube 11 are fitted with each other in a close-fitting manner. There is a plurality of adjustment gaps 5 between the inner circumferential wall of the assembly hole 21 and the outer circumferential wall 111 of the shaft tube 11, with each being located between two adjacent close-fitting portions 4.

The rotor 3 comprises a hub 31 and a permanent magnet 32. The hub 31 has a shaft 311 rotatably coupled within the shaft tube 11 of the base 1. The permanent magnet 32 is an annual magnet coupled with an inner circumferential wall of the hub 31. There is an air gap between the permanent magnet 32 and the stator 2.

During operation of the motor, the stator 2 generates an alternating magnetic field including magnetic flux flowing in the air gap, causing the stator 2 to react with the permanent magnet 32 via the alternating magnetic field, thus making the rotor 3 rotate.

The motor of the invention is characterized by that the stator 2 may be fitted to the outer circumferential wall 111 of the shaft tube 11 in a close-fitting manner via the close-fitting portions 4 formed between the inner circumferential wall of the assembly hole 21 and the outer circumferential wall 111 of the shaft tube 11, thereby providing a better fitting between the stator 2 and the shaft tube 11. More importantly, although the stator 2 and the shaft tube 11 are closely fitted with each other, the shaft tube 11 may be prevented from being excessively compressed by the stator 2 via the adjustment gaps 5 between each two adjacent close-fitting portions 4, thus further avoiding deformation, damaging or shifting of the bearing 12 when the bearing 12 is subjected to the direct compression of the shaft tube 11. Moreover, when the shaft tube 11 is a plastic shaft tube which deforms due to the hot-swelling and cool-shrinking effect, the shaft tube 11 may be prevented from being excessively compressed by the stator 2 via the buffering effect provided by the adjustment gaps 5. In general, the adjustment gaps 5 formed between each two adjacent close-fitting portions 4 may provide the space flexibility for the shaft tube 11 when the shaft tube 11 is deformed due to an undesired event.

Based on the structure of the motor, the close-fitting portions 4 and the adjustment gaps 5 may be embodied in various ways described below.

In FIGS. 4 through 6, a first embodiment of the close-fitting portions 4 and the adjustment gaps 5 is shown. The close-fitting portions 4 may be at least one protrusion formed on the inner circumferential wall of the assembly hole 21, in which the protrusion may be in a rib-like or a roundish form, or the like. The shaft tube 11 has an outer tube diameter (D) in a radial direction thereof. A minimal diameter of the assembly hole 21 is designed to be smaller than the outer tube diameter of the shaft tube 11 so that the stator 2 is fitted to the outer circumferential wall 111 of the shaft tube 11 more closely. In the embodiment, the protrusions are in the form of ribs 211, and the number of the ribs 211 is two, with the ribs 211 axially extended along the inner circumferential wall of the assembly hole 21. However, there may only be one rib 211 used, depending on requirements. The two ribs 211 may be radially extended on the inner circumferential wall of the assembly hole 21, with the ribs 211 in contact with the outer circumferential wall 111 of the shaft tube 11. A contact interface with an axial height (H), where the ribs 211 are closely fitted with the shaft tube 11, is formed. An axial extension range of the adjustment gaps 5 is aligned with the axial height (H). Based on this, the axially extended adjustment gaps 5 may provide the space flexibility for the deformed portions of the shaft tube 11 when the shaft tube 11 is deformed due to excessive compression of the stator 2.

Figure 7:
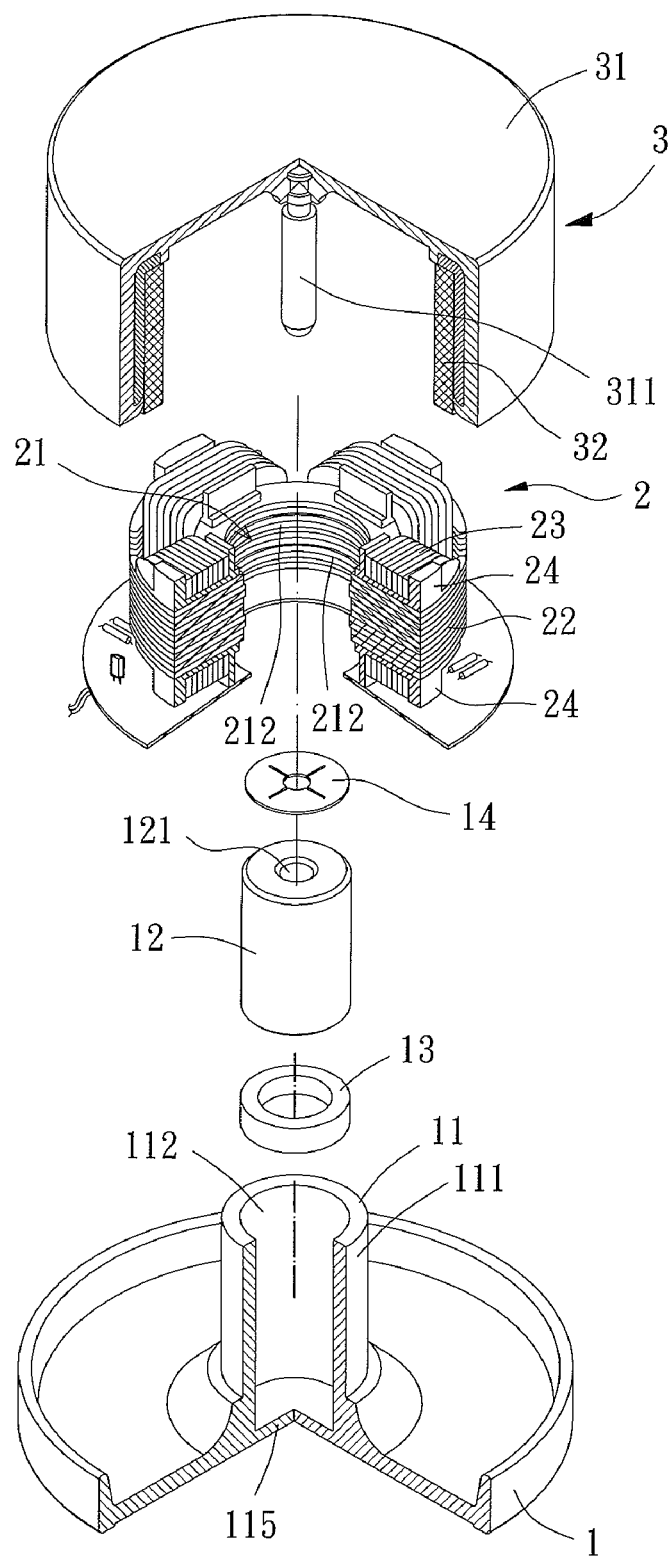
FIG. 7 shows an exploded diagram of a motor according to a second embodiment of the invention.
Figure 8:
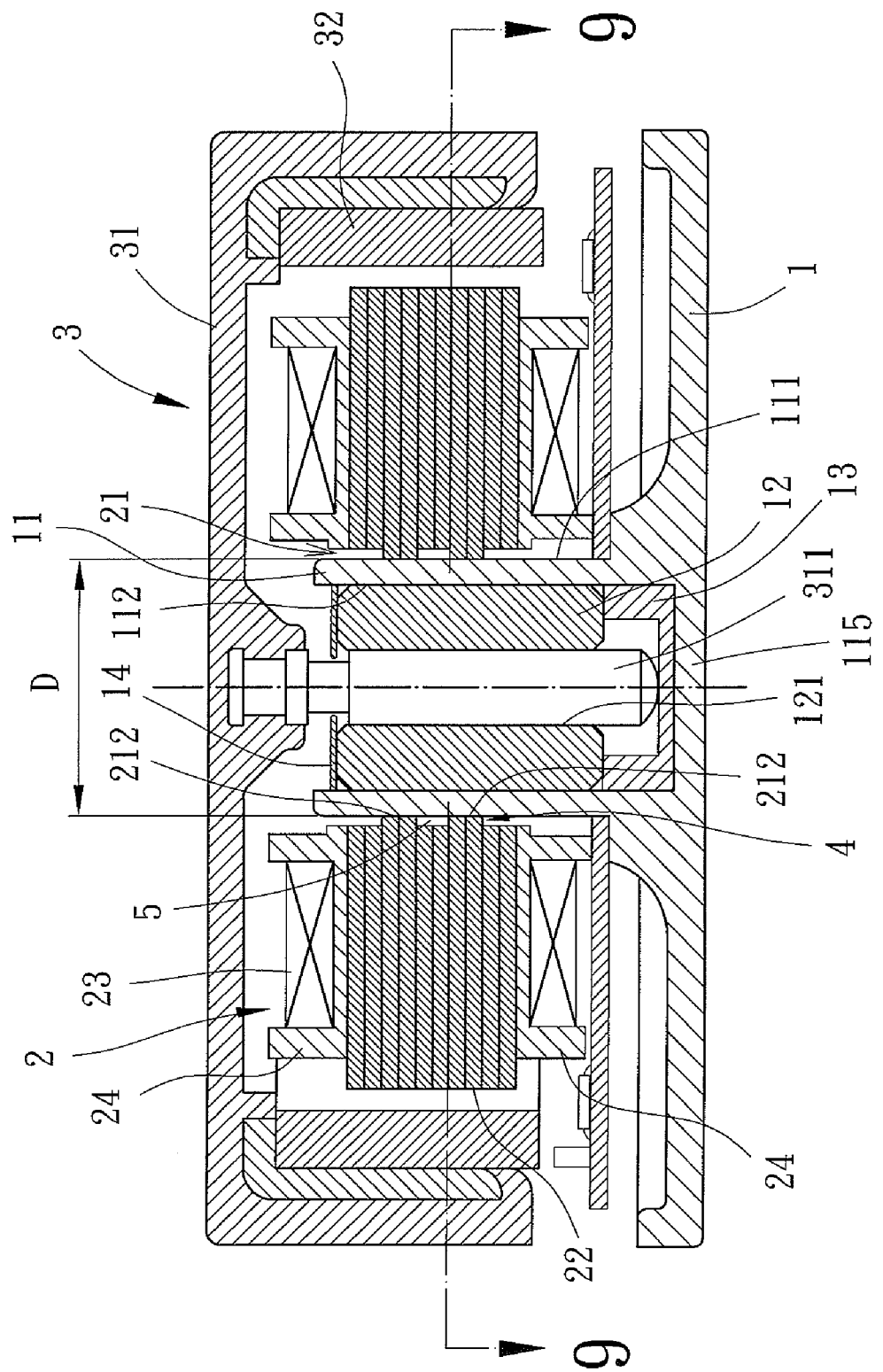
FIG. 8 shows a side cross sectional view of the motor according to the second embodiment of the invention.
Figure 9:
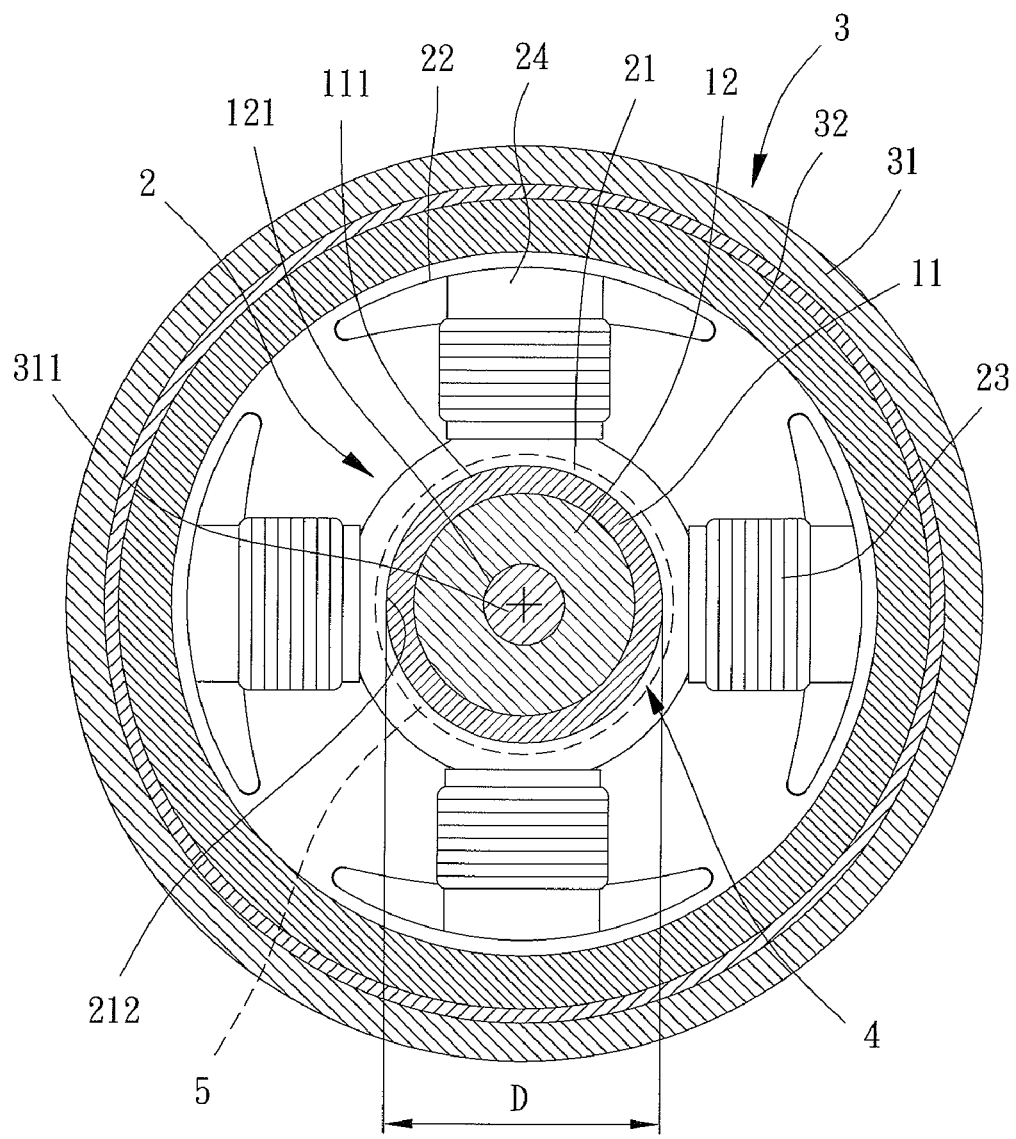
FIG. 9 shows an upper cross sectional view of the motor according to the second embodiment of the invention according to section line 9-9 of FIG. 8.

In FIGS. 7 through 9, a second embodiment of the close-fitting portions 4 and the adjustment gaps 5 is shown. Similarly, the close-fitting portions 4 may be at least one protrusion formed on the inner circumferential wall of the assembly hole 21, in which the protrusion may be in a ring-like form or similar structures. A minimal diameter of the assembly hole 21 is designed to be smaller than the outer tube diameter of the shaft tube 11 so that the stator 2 is fitted to the outer circumferential wall 111 of the shaft tube 11 more closely. In the embodiment, the protrusions are designed as protruding rings 212, and the number of the protruding rings 212 is two. However, there may only be one protruding ring 212 used, depending on requirements. The protruding rings 212 may be axially arranged and formed along the inner circumferential wall of the assembly hole 21. The protruding rings 212 are in contact with the outer circumferential wall 111 of the shaft tube 11. The adjustment gap 5 is formed on two sides of the protruding rings 212 in an axial direction thereof. Based on this, the adjustment gap 5 may provide the space flexibility for the deformed portions of the shaft tube 11 when the shaft tube 11 is deformed due to excessive compression of the stator 2.

Figure 10:
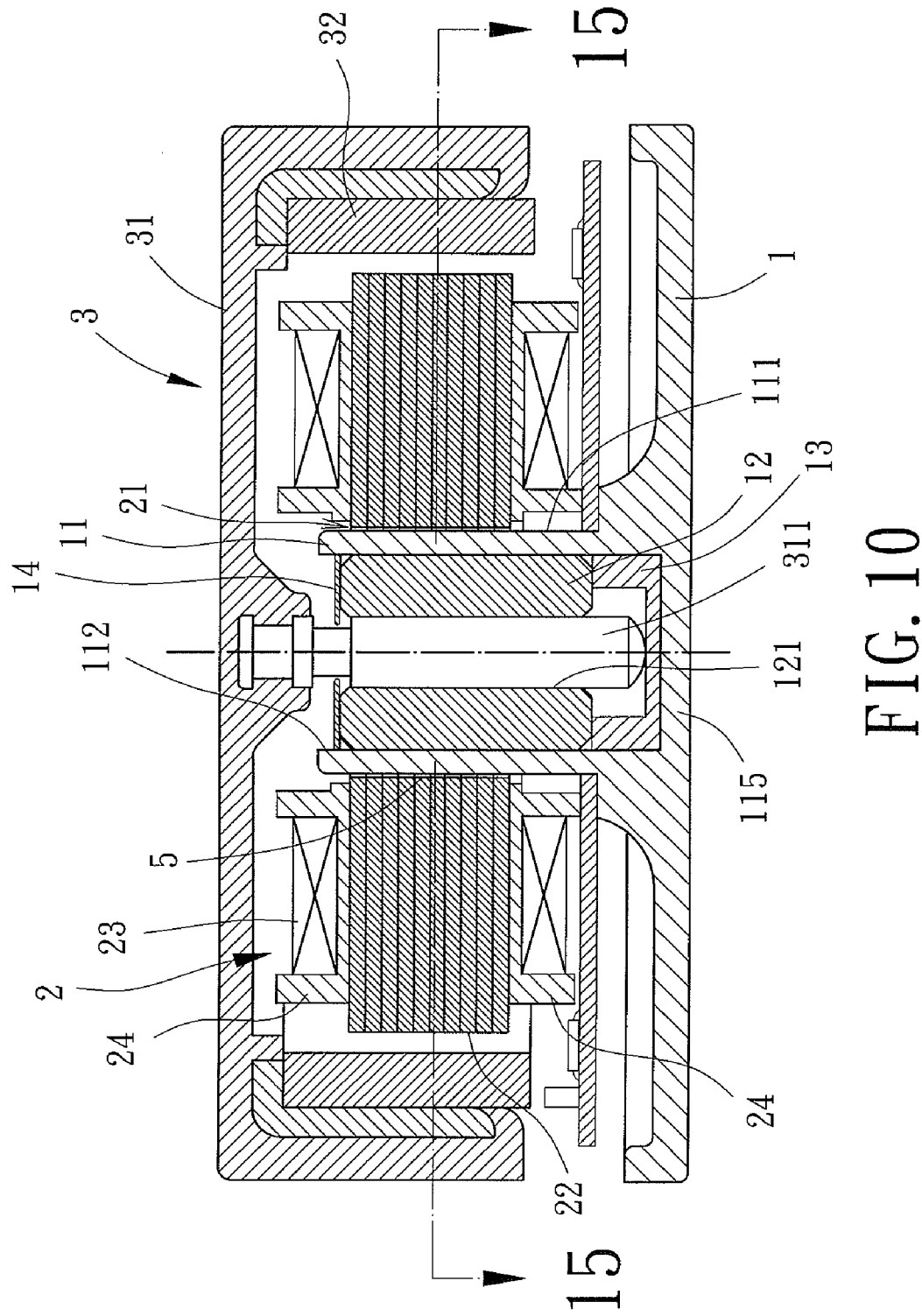
FIG. 10 shows a side cross sectional view of a motor according to a third embodiment of the invention
Figure 11:
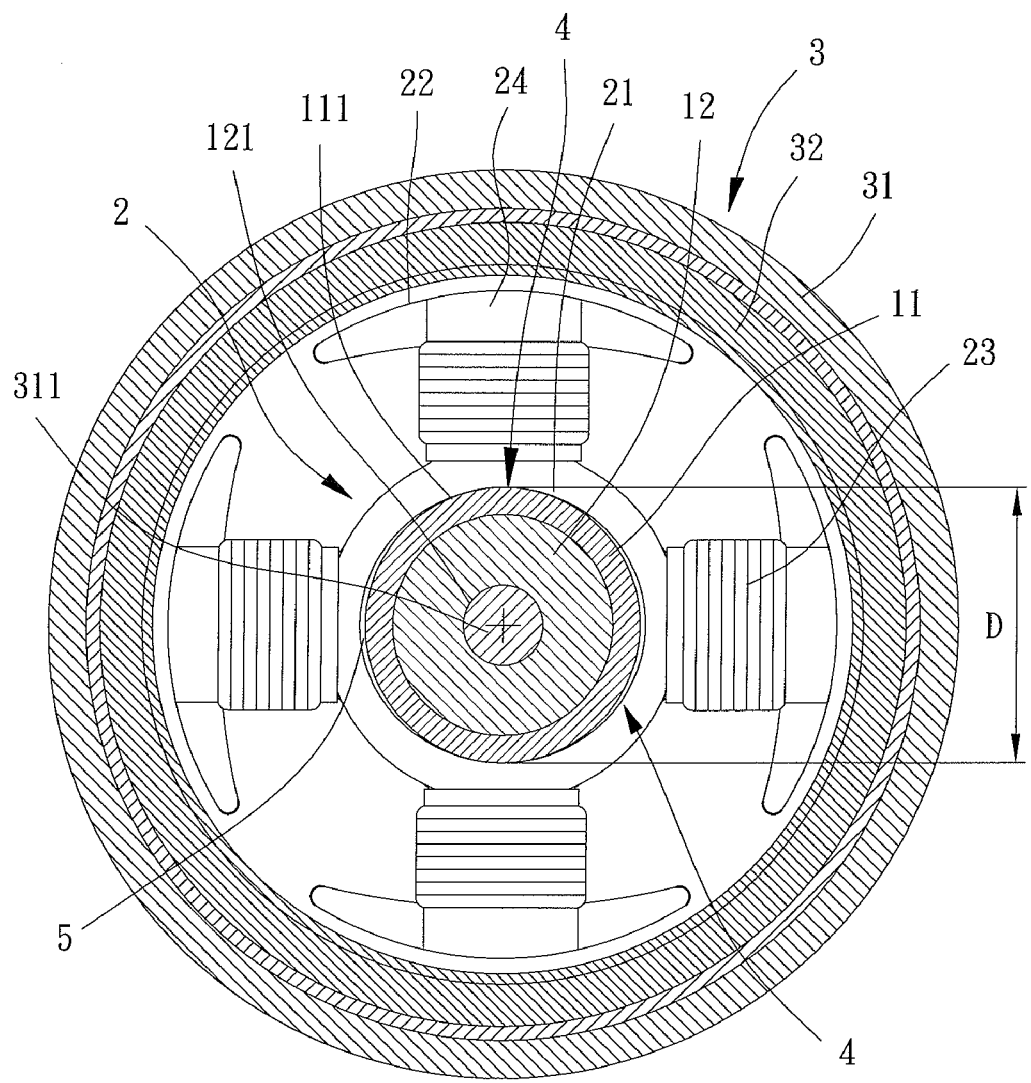
FIG. 11 shows an upper cross sectional view of the motor according to the third embodiment of the invention.

In FIGS. 10 and 11, a third embodiment of the close-fitting portions 4 and the adjustment gaps 5 is shown. The assembly hole 21 appears to be an imperfect circle in a radial cross-sectional view thereof. Based on this, a minimal diameter of the assembly hole 21 is designed to be smaller than the outer tube diameter of the shaft tube 11. In another case, the shaft tube 11 is an imperfect circular tube in a radial cross-sectional view thereof. Based on this, a maximum diameter of the shaft tube 11 (D) is designed to be larger than a diameter of the assembly hole 21, as shown in FIG. 11. Based on this, despite that the assembly hole 21 is selected as an imperfect hole or the shaft tube 11 is selected as an imperfect circular tube, the two opposing close-fitting portions 4 shown in FIG. 11 may be formed, with an adjustment gap 5 formed between each two adjacent close-fitting portions 4. Based on this, the adjustment gaps 5 may provide the space flexibility for the deformed portions of the shaft tube 11 when the shaft tube 11 is deformed due to excessive compression of the stator 2. In contrast to the first and second embodiments, the stator 2 and the shaft tube 11 in the embodiment have simpler structures. Therefore, the manufacturing cost is reduced.

Figure 12:
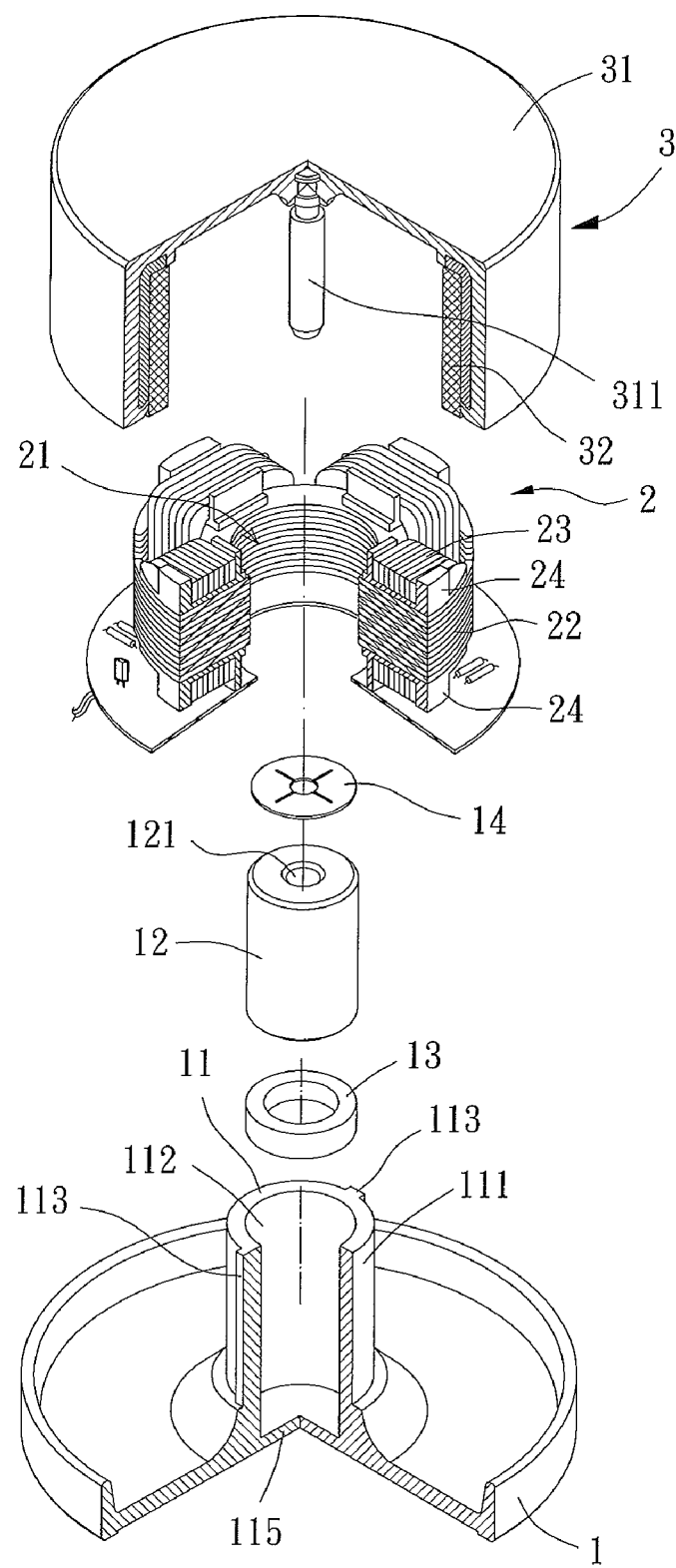
FIG. 12 shows an exploded diagram of a motor according to a fourth embodiment of the invention.
Figure 13:
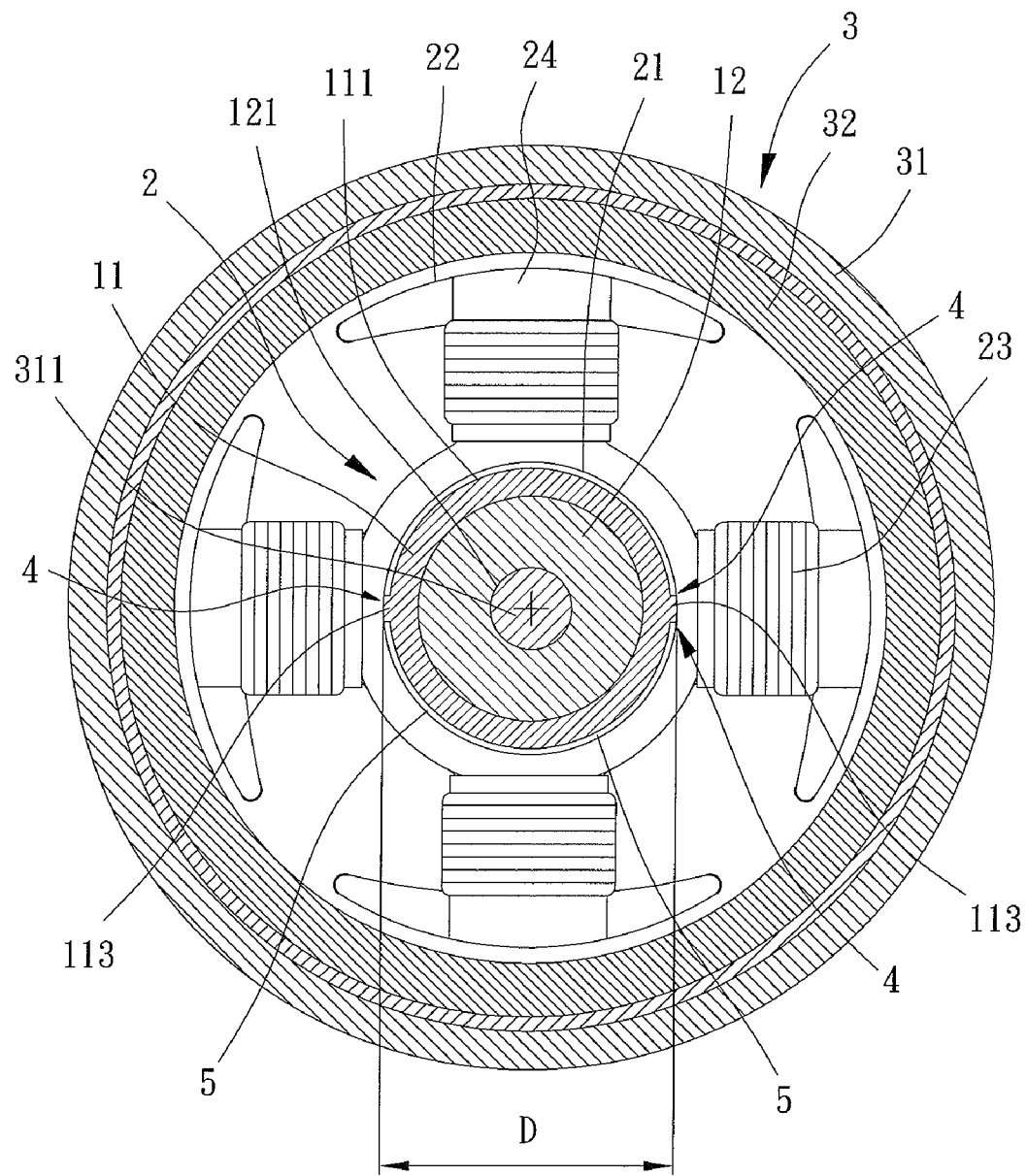
FIG. 13 shows an upper cross sectional view of the motor according to the fourth embodiment of the invention.

In FIGS. 12 and 13, a fourth embodiment of the close-fitting portions 4 and the adjustment gaps 5 is shown. The close-fitting portions 4 may be at least one protruding column 113 formed on the outer circumferential wall 111 of the shaft tube 11, in which the protruding column(s) 113 is axially extended on the outer circumferential wall 111 of the shaft tube 11. A maximum outer tube diameter of the shaft tube 11 is designed to be larger than the diameter of the assembly hole 21 so that each protruding column 113 is allowed to contact with the inner circumferential wall of the assembly hole 21 of the stator 2. As a result, at least one close-fitting portion 4 is formed. The areas between the inner circumferential wall of the assembly hole 21 and the outer circumferential wall 111 of the shaft tube 11, excluding the protruding column(s) 113, are deemed as the adjustment gap(s) 5. Based on this, the structure intensity of the shaft tube 11 may be enhanced via the use of the protruding column(s) 113, preventing the deformation of the shaft tube 11 when the shaft tube 11 is subjected to compression of the stator 2. Similarly, the adjustment gap (s) 5 may provide the space flexibility for the deformation of the shaft tube 11. Instead of having the ribs 211 and the protruding rings 212 formed on the inner circumferential wall of the assembly hole 21 of the stator 2 as disclosed in the previous embodiments, the protruding column(s) 113 is directly formed on the shaft tube 11 in this embodiment. In this way, apart from that the structure intensity of the shaft tube 11 is increased, the manufacturing of the close-fitting portions 4 is also simplified in the embodiment due to the easier molding of the shaft tube 11.

Figure 14:
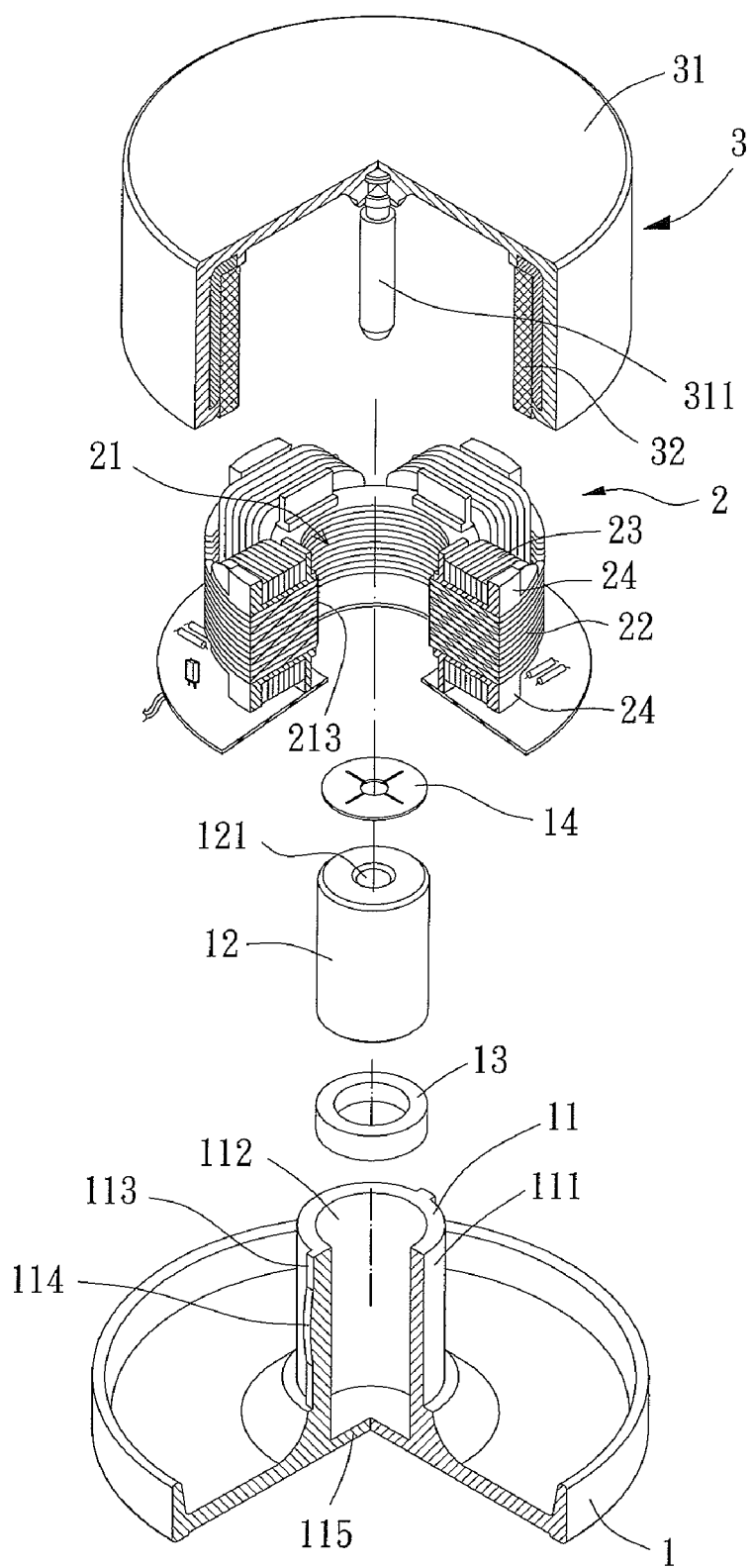
FIG. 14 shows an exploded diagram of the motor having a positioning groove according to the fourth embodiment of the invention.
Figure 15:
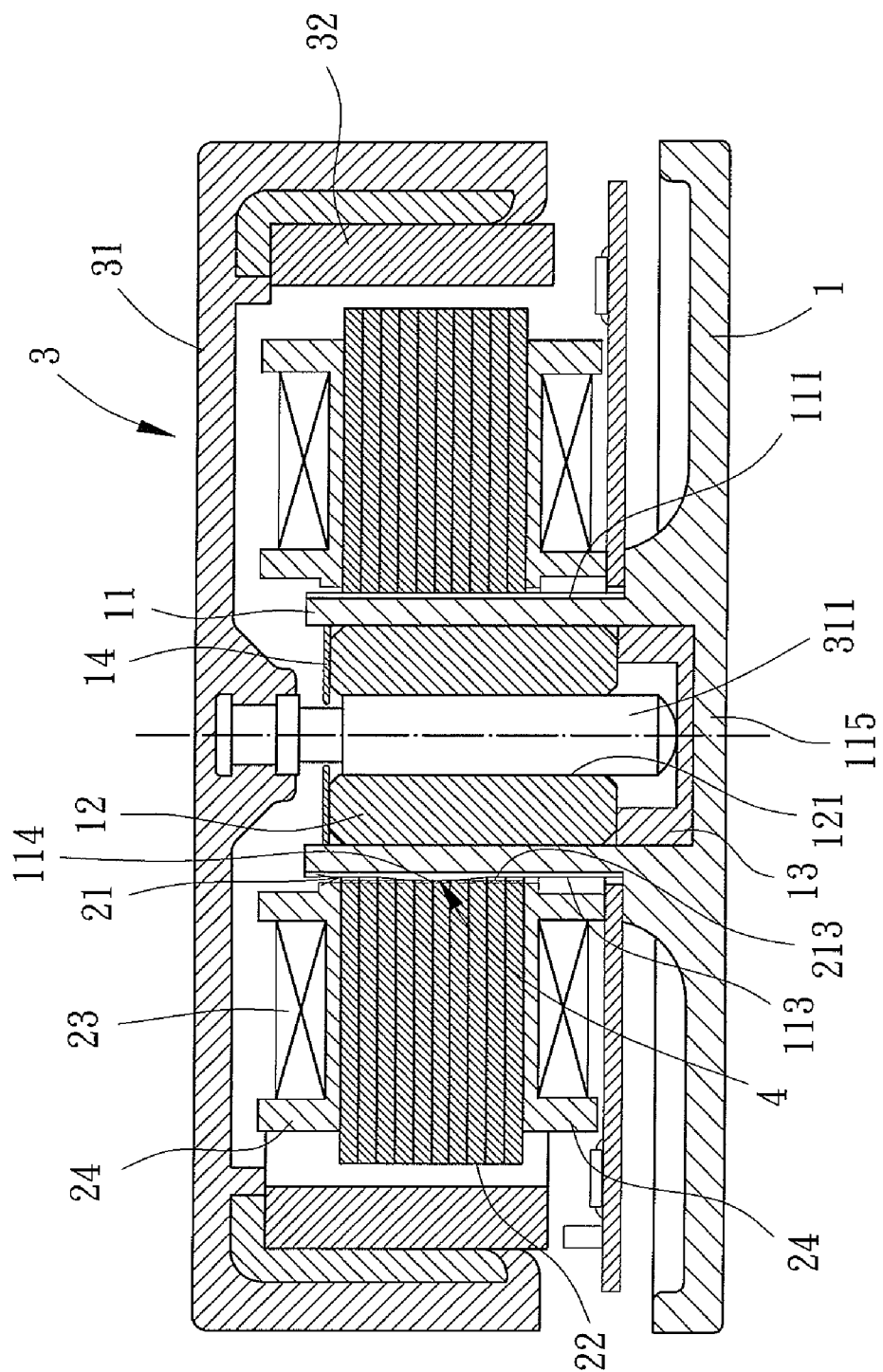
FIG. 15 shows a side cross sectional view of the motor having the positioning groove according to the fourth embodiment of the invention according to section line 15-15 of FIG. 10.

Specifically, as shown in FIGS. 14 and 15, a positioning groove 213 may be further formed on the inner circumferential wall of the assembly hole 21 of the stator 2 according to the fourth embodiment of the invention. The positioning groove 213 is axially extended on the inner circumferential wall of the assembly hole 21. One of the protruding columns 113 formed on the outer circumferential wall 111 of the shaft tube 11 may be coupled with the positioning groove 213, and the protruding column 113 that is coupled with the positioning groove 213 may form a bulged portion 114. The bulged portion 114 may contact an inner wall of the positioning groove 213. In this way, under a condition that the close-fitting relationship between the stator 2 and the shaft tube 11 is not affected, an easy assembly of the stator 2 and the shaft tube 11 may be achieved via the use of the positioning groove 213.

Based on the motor structures previously described, to further improve the motor, the motor of the invention may further include at least one of the following secondary features or any combination thereof, as elaborated below.

An enclosed portion 115 may be formed on another end of the shaft tube 11, as shown in FIG. 4. With the enclosed portion 115, leaking of oil may be prevented. In another respect, the enclosed portion 115 may limit deformation on the other end of the shaft tube 11 when the stator 2 is fitted to the shaft tube 11 too closely.

A side of the enclosed portion 115 inside the shaft tube 11 may have a planar surface. Based on this, the shaft 311 may be positioned more easily during assembly, providing a better perpendicularity of the shaft 311.

Based on the embodiment described in FIGS. 4, 7 and 10, under a condition that the functions of the close-fitting portions 4 and the adjustment gaps 5 are not affected, the positioning groove 213 and the protruding column 113 may be configured to provide easy assembly for the stator 2 and the shaft tube 11. The detailed structures of the positioning groove 213 and the protruding column 113 have been described, so it's not described herein for brevity.

Figure 16:
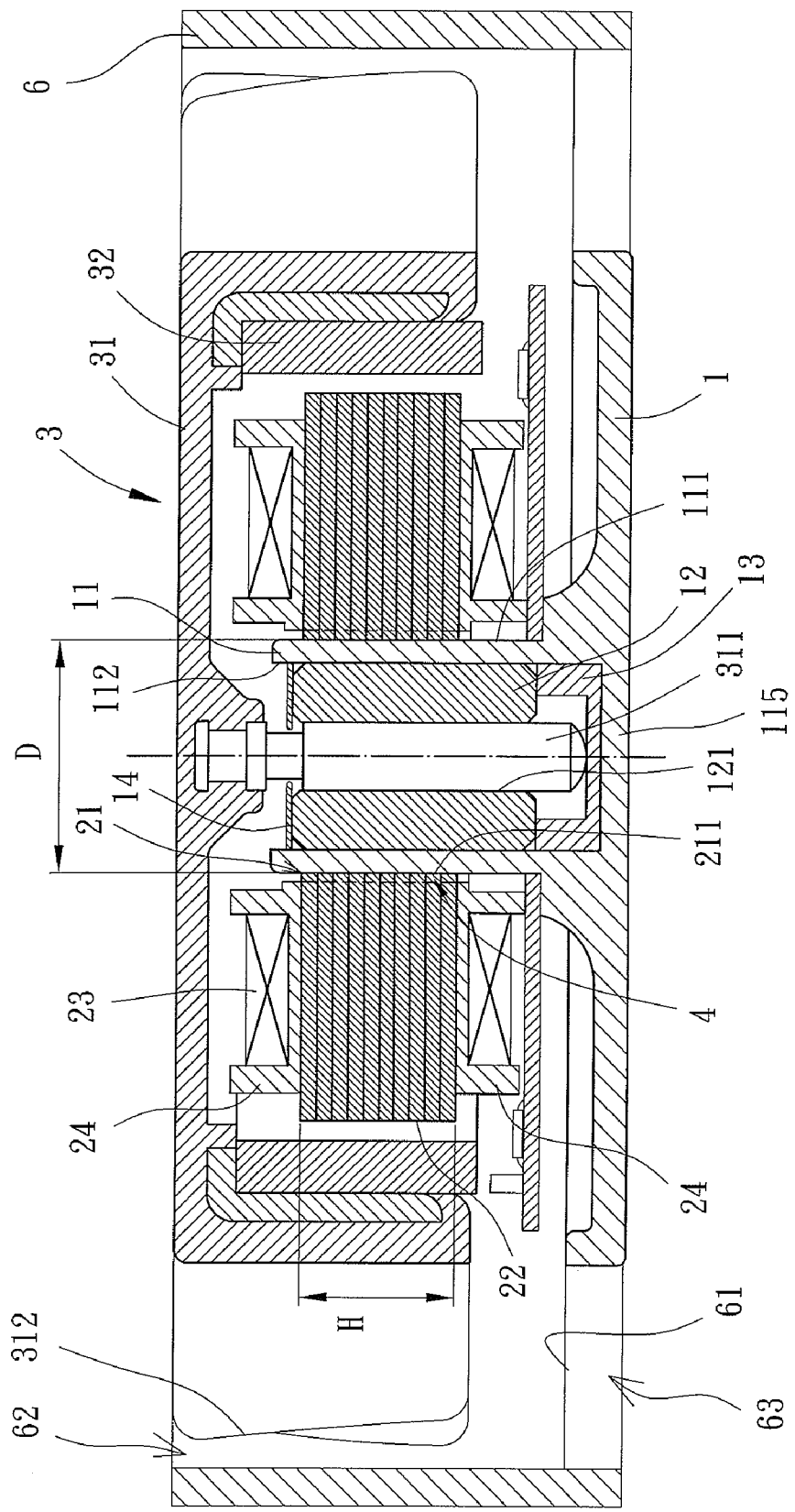
FIG. 16 shows a side cross sectional view of a heat-dissipating fan having a motor according to the invention.

The motor of the invention may be applied to a heat-dissipating fan, such as an air-blowing fan or an axial flow fan. In FIG. 16, an axial flow fan with the motor is disclosed. In FIG. 16, a frame structure of a fan, which has an air inlet 62 and an air outlet 63, may be formed by coupling the base 1 to a frame body 6 via a plurality of connection members 61 (such as ribs or stationary blades). A plurality of blades 312 may be radially extended from the hub 31 of the rotor 3. Based on this, the heat-dissipating fan may be equipped in various electronic devices or instruments. During operation of the rotor 3, external air is drawn into the heat-dissipating fan by the blades 312 via the air inlet 62, and is discharged from the heat-dissipating fan to a heat source via the air outlet 63, thereby achieving heat dissipating.

According to the above description, the adjustment gaps 5 may be configured to provide the space flexibility for deformation of the shaft tube 11, thereby avoiding deformation, damaging or shifting of the shaft tube 11 when the shaft tube 11 is subjected to excessive compression of the stator 2 during assembly of the motor. In this way, deformation, damaging or shifting of the shaft tube 11 may be avoided, and the convenience of assembly is also increased, thus achieving advantages such as prolonging lifespan, decreasing noise and improving quality of the motor.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor comprising:
 a base equipped with a shaft tube having an outer circumferential wall;
 a stator coupled with the shaft tube of the base and having an assembly hole, wherein a plurality of close-fitting portions is formed between an inner circumferential wall of the assembly hole and the outer circumferential wall of the shaft tube, and an adjustment gap is formed between each two adjacent close-fitting portions; and
 a rotor having a shaft rotatably coupled within the shaft tube of the base, wherein the plurality of close-fitting portions comprise at least one protrusion formed on the inner circumferential wall of the assembly hole, the shaft tube has an outer tube diameter in a radial direction thereof, and a minimal diameter of the assembly hole is smaller than the outer tube diameter of the shaft tube.

2. The motor as claimed in claim 1, wherein each of the at least one protrusion is a rib axially extended along the inner circumferential wall of the assembly hole, the rib is coupled with the outer circumferential wall of the shaft tube, a contact interface where the rib is closely fitted with the shaft tube is formed and the contact interface has an axial height, and wherein an axial extension range of the adjustment gap is aligned with the axial height.

3. The motor as claimed in claim 1, wherein each of the at least one protrusion is a protruding ring formed on the inner circumferential wall of the assembly hole, the protruding ring is coupled with the outer circumferential wall of the shaft tube, and the adjustment gap is located on two sides of the protruding ring edge.

4. The motor as claimed in claim 1, wherein the plurality of close-fitting portions comprise at least one protruding column formed on the outer circumferential wall of the shaft tube, the at least one protruding column is axially extended on the outer circumferential wall of the shaft tube, and a maximum diameter of the shaft tube is larger than a diameter of the assembly hole.

5. The motor as claimed in claim 4, wherein the number of the at least one protruding column is two, a positioning groove is formed on the inner circumferential wall of the assembly hole of the stator, the positioning groove is axially extended on the inner circumferential wall of the assembly hole, and one of the two protruding columns formed on the outer circumferential wall of the shaft tube is coupled with the positioning groove.

6. The motor as claimed in claim 1, wherein an enclosed portion is formed on an end of the shaft tube.

7. The motor as claimed in claim 6, wherein a side of the enclosed portion inside the shaft tube comprises a planar surface.

8. The motor as claimed in claim 1, wherein the base is coupled to a frame body via a plurality of connection members to form a frame structure with an air inlet and an air outlet, and a plurality of blades is radially extended from the rotor.

9. A motor comprising:
a base equipped with a shaft tube having an outer circumferential wall;
a stator coupled with the shaft tube of the base and having an assembly hole, wherein a plurality of close-fitting portions is formed between an inner circumferential wall of the assembly hole and the outer circumferential wall of the shaft tube, and an adjustment gap is formed between each two adjacent close-fitting portions; and
a rotor having a shaft rotatably coupled within the shaft tube of the base, wherein the assembly hole of the stator is an imperfect circle in a radial cross section thereof, and a minimal diameter of the assembly hole is smaller than the outer tube diameter of the shaft tube such that two opposing close-fitting portions are formed as the plurality of close-fitting portions.

10. The motor as claimed in claim 9, wherein an enclosed portion is formed on an end of the shaft tube.

11. The motor as claimed in claim 10, wherein a side of the enclosed portion inside the shaft tube comprises a planar surface.

12. The motor as claimed in claim 9, wherein the base is coupled to a frame body via a plurality of connection members to form a frame structure with an air inlet and an air outlet, and a plurality of blades is radially extended from the rotor.

13. A motor comprising:
a base equipped with a shaft tube having an outer circumferential wall;
a stator coupled with the shaft tube of the base and having an assembly hole, wherein a plurality of close-fitting portions is formed between an inner circumferential wall of the assembly hole and the outer circumferential wall of the shaft tube, and an adjustment gap is formed between each two adjacent close-fitting portions, wherein the plurality of close-fitting portions comprise at least one protruding column formed on the outer circumferential wall of the shaft tube, wherein the at least one protruding column is axially extended on the outer circumferential wall of the shaft tube;
a positioning groove is formed on the inner circumferential wall of the assembly hole of the stator, wherein the positioning groove is axially extended on the inner circumferential wall of the assembly hole, wherein one of the at least one protruding column is coupled with the positioning groove and forms a bulged portion, wherein the bulged portion is coupled with an inner wall of the positioning groove; and
a rotor having a shaft rotatable coupled within the shaft tube of the base, and wherein a maximum diameter of the shaft tube is larger than a diameter of the assembly hole.

14. The motor as claimed in claim 13, wherein an enclosed portion is formed on an end of the shaft tube.

15. The motor as claimed in claim 14, wherein a side of the enclosed portion inside the shaft tube comprises a planar surface.

16. The motor as claimed in claim 13, wherein the base is coupled to a frame body via a plurality of connection members to form a frame structure with an air inlet and an air outlet, and a plurality of blades is radially extended from the rotor.

* * * * *